US010041522B2

(12) United States Patent
Makino et al.

(10) Patent No.: US 10,041,522 B2
(45) Date of Patent: Aug. 7, 2018

(54) BLIND RIVET AND SEALING STRUCTURE USING SAME

(71) Applicant: NEWFREY LLC, Newark, DE (US)

(72) Inventors: Takanori Makino, Toyohashi (JP); Kanji Sakoda, Toyohashi (JP)

(73) Assignee: NEWFREY LLC, New Britain, CT (US)

( * ) Notice: Subject to any disclaimer, the term of this patent is extended or adjusted under 35 U.S.C. 154(b) by 68 days.

(21) Appl. No.: 14/662,410

(22) Filed: Mar. 19, 2015

(65) Prior Publication Data

US 2015/0192161 A1    Jul. 9, 2015

Related U.S. Application Data

(63) Continuation of application No. PCT/JP2013/077150, filed on Oct. 4, 2013.

(30) Foreign Application Priority Data

Oct. 31, 2012   (JP) ................................. 2012-240006

(51) Int. Cl.
   *F16B 13/04*    (2006.01)
   *F16B 19/10*    (2006.01)
   *F16B 19/00*    (2006.01)

(52) U.S. Cl.
   CPC ........ *F16B 19/1054* (2013.01); *F16B 19/008* (2013.01)

(58) Field of Classification Search
   CPC ....................................................... F16B 19/04
   USPC ........................................................... 411/43
   See application file for complete search history.

(56) References Cited

U.S. PATENT DOCUMENTS

| 2,438,976 | A | * | 4/1948 | Lautmann | ............... F16B 19/12 |
| | | | | | 411/19 |
| 3,136,203 | A | * | 6/1964 | Davis | ................. F16B 19/1054 |
| | | | | | 29/509 |
| 3,255,797 | A | * | 6/1966 | Attwood | ............... F16B 35/065 |
| | | | | | 411/188 |
| 3,300,798 | A | * | 1/1967 | York | ........................ B21K 1/60 |
| | | | | | 29/509 |

(Continued)

FOREIGN PATENT DOCUMENTS

| EP | 0766012 | 4/1997 |
| GB | 738741 | 10/1955 |

(Continued)

*Primary Examiner* — Gary W Estremsky
(74) *Attorney, Agent, or Firm* — Kofi A. Schulterbrandt; Michael P. Leary

(57) ABSTRACT

A blind rivet having sealing and water-tightness features. The blind rivet is fastenable to a member having an opening and includes a rivet body and mandrel. The rivet body has a flange having a large diameter, a taper portion which is adjacent the flange and a sleeve which extends along the axial direction from the taper portion. A hole having a bottom is formed from the surface of the flange to the bottom of the sleeve. The mandrel has a head. The head of the mandrel is disposed at the bottom portion of the hole. A thick portion is formed at a portion of the sleeve, and thus the head is irremovably held in the hole. The mandrel is pulled, the sleeve is enlarged, and a substrate is sealed between the enlarged portion and the flange. A sealing structure using the blind rivet is also provided.

9 Claims, 4 Drawing Sheets

(56) References Cited

U.S. PATENT DOCUMENTS

| | | | | |
|---|---|---|---|---|
| 3,345,901 A | | 10/1967 | Brosseit | |
| 3,438,301 A | * | 4/1969 | Mattioli | B21J 15/043 411/34 |
| 3,534,419 A | * | 10/1970 | Putetti | B21J 15/043 29/510 |
| 3,916,970 A | * | 11/1975 | Owens | B60C 15/0226 152/379.4 |
| 4,281,581 A | * | 8/1981 | Jackson | F16B 5/04 411/19 |
| 4,293,258 A | * | 10/1981 | McKewan | F16B 19/083 411/30 |
| 4,493,141 A | * | 1/1985 | Krezak | F16B 19/06 29/509 |
| 4,521,147 A | * | 6/1985 | King, Jr. | F16B 19/1054 411/43 |
| 4,948,550 A | * | 8/1990 | Worthy | G21C 13/067 138/89 |
| 5,248,231 A | * | 9/1993 | Denham | F16B 19/1054 411/38 |
| 5,645,383 A | * | 7/1997 | Williams | F16B 19/1054 411/38 |
| 5,689,873 A | * | 11/1997 | Luhm | B23B 41/00 29/525.11 |
| 5,878,788 A | * | 3/1999 | Gurry | B21F 1/002 140/71 R |
| 6,053,682 A | * | 4/2000 | Krauter | B60T 8/4022 411/369 |
| 6,487,767 B1 | * | 12/2002 | Reid | B25B 27/0014 29/243.522 |
| 6,852,380 B2 | * | 2/2005 | Tremblay | E06B 3/677 428/34 |
| 8,292,560 B2 | * | 10/2012 | McGee | F16B 19/1072 411/34 |
| 2005/0201844 A1 | * | 9/2005 | Davies | F16B 33/004 411/34 |
| 2009/0035089 A1 | * | 2/2009 | Davies | F16B 19/1054 411/43 |

FOREIGN PATENT DOCUMENTS

| | | |
|---|---|---|
| JP | 47039837 | 10/1972 |
| JP | S58-167306 U | 8/1983 |
| JP | 58167306 | 11/1983 |
| JP | 2004340334 | 12/2004 |
| JP | 2012145167 | 8/2012 |

* cited by examiner

Prior Art

Prior Art

BLIND RIVET AND SEALING STRUCTURE USING SAME

CROSS REFERENCE TO RELATED APPLICATIONS

This application is a continuation of PCT/JP2013/077150, filed Oct. 4, 2013 which claims priority from Japanese Patent Application No. 2012-240006, filed Oct. 31, 2012, the disclosure of which is incorporated herein by reference in its entirety.

TECHNICAL FIELD

The invention concerns a blind rivet. In particular, it concerns a blind rivet and sealing structure using same that has a taper on the reverse side of the blind rivet with a high degree of mounting stress and can achieve sufficient water tightness with a single blind rivet.

BACKGROUND ART

Blind rivets that are provided with a metal rivet main body having a sleeve and a flange on one end of the sleeve, a head and a metal mandrel having a shaft extending from the head, are well known. An advantage of a blind rivet is that it can connect to a plurality of panels by working from just one side.

A user would expect sufficient sealing and a high degree of water tightness between the rivet and the base body such as a panel (the attached member) after the blind rivet is fastened.

There are two types of blind rivets. One is a sealed type in which the head of the mandrel, which causes the rivet main body to change when fastening, is set in the middle of the rivet, and the remaining head of the mandrel is not exposed to the blind side opposite the working side after fastening to the base body. The other is an open type in which the head of the mandrel sticks out of the rivet, and the remaining head of the mandrel is exposed to the blind side after fastening to the base body.

The open type of blind rivet is not sufficiently watertight; it is easy for liquid to seep between the rivet main body and the remaining head of the mandrel because the remaining head of the mandrel is exposed after fastening. The sealed type of blind rivet has excellent water tightness; after fastening, it is more difficult for liquid to seep compared to the valved type, because only the rivet main body is exposed to the blind side after fastening.

Kokai 2012-9288 discloses a sealing device consisting of a sealed type blind rivet, which seals the opening of a sealed rechargeable battery, and a resinous sleeve. The sealing device is provided with a metal core having a shaft and a large-diameter part, a flange bottomed metallic cylindrical member and a flange bottomed resinous sleeve into which part of the metallic cylindrical member is inserted from the opening side. When the metal core is pulled out of the metallic cylindrical member, the metallic cylindrical member is modified by the large-diameter part expanding in a radial direction. The resinous sleeve, expanding in a radial direction by the change of the metallic cylindrical member, seals the opening of the sealed rechargeable battery.

The sealing device of Kokai 2012-9288, while maintaining cohesion of the resinous sleeve and the battery contents, is able to hold a hermetic seal of the battery. However, because it uses a bottomed resinous sleeve besides a blind rivet, the number of parts will be many, and cost will be high.

Kokai 2012-145167 discloses a shield type blind rivet consisting of a mandrel and a rivet. The mandrel has a large diameter head on one end in the shape of a round rod. The rivet has a rivet main body in which one end is closed in the shape of a cylinder, and on the other end of the rivet main body, there is a flange. The rivet has the mandrel set so that it cannot come out by sealing the head when positioning it on the closed end. The rivet main body has a taper whose exterior form gets gradually smaller toward one end from the part connecting with the flange.

Because it has a taper, in the blind rivet of Kokai 2012-145167, the area of overlap to the hole for a plate rivet and the rivet main body becomes smaller and a high degree of water tightness can be attained.

However, this taper is provided with a small angle on the rivet main body, because it is assumed that it will overlap the hole for the plate rivet; if the variability of the inner diameter of the hole for the plate rivet is great, it is easy in the blind rivet of Kokai 2012-145167 for a part of the hole for the plate rivet not to overlap, and a high degree of water tightness cannot be attained at all.

Kokai 2002-529663 discloses a blind rivet consisting of a head, an outer part in which a bottomed axial hole forms a shank extending from the head, a stem head and an inner part that has a stem disposed in the axial hole. The shank has a shank fastening part with a taper.

The blind rivet of Kokai 2002-529663 has a problem with insufficient filling of the hole below the head, as the shank is actually mutually dependent on the work piece hole.

However, the blind rivet of Patent Reference 3 is of the open type and, because the remainder part of the mandrel is exposed to the blind side, it is easy for leaking to occur between the rivet main body and the remainder part of the mandrel, so insufficient water tightness is an inherent problem with the open type.

For this reason, we are seeking a blind rivet having a sufficient seal in the single blind rivet and a high degree of water tightness without the use of a washer or an O-ring.

SUMMARY OF THE INVENTION

Thus, the object of the present invention is to provide a blind rivet that achieves a satisfactory seal with a single blind rivet.

An additional object of the invention is to provide a sealing structure using this blind rivet.

In order to achieve this object, the invention has a taper adjacent to the flange of the rivet main body of the blind rivet, the contact area of the edge of the opening of the base body and the back of the flange becomes small, the contact stress of the small contacting part is increased; this makes a secure seal.

One embodiment of the invention is a blind rivet for fastening to a base body having an opening; it is provided with a rivet main body that has a disc-shaped large-diameter flange of a certain thickness, a taper with a gradually diminishing outer diameter that is separated at a distance from the flange and adjacent to it and a sleeve extending in an axial direction from the taper and in which a bottomed hole is formed from the surface of the sleeve to the bottom of the hole; there is also a mandrel having a head and a slender shaft that extends from the head with a smaller diameter than the head. The head of the mandrel is arranged at the bottom of the bottomed hole in the rivet main body;

the shaft is combined so as to extend from the top surface of the flange of the rivet main body; in the sleeve of the rivet main body, a thick section with an inner diameter smaller than the outer diameter of the head is formed at a position adjacent to the head of the mandrel. The head is held by the thick section so that it cannot be moved from the bottomed hole of the rivet main body.

This blind rivet is a sealed type with good sealing characteristics. Also, when there is a taper adjacent to the flange of the rivet main body, contact of the taper and the edge of the opening of the base body can be securely made. The disc-shaped flange of a certain thickness is rigid and difficult to deform.

In the cross-section containing the central axis of the rivet main body, the angle of the taper surface of the taper and the straight line orthogonal to the central shaft of the blind rivet is 3-80°.

An angle of 15-35° is preferable.

When the taper inclines at this angle, the taper of the rivet main body and the edge of the opening of the base body can touch at an appropriate angle and make contact at an adequately narrow width.

It is desirable that the thickness of the flange of the rivet main body be 15-75% of the outer diameter of the sleeve.

The flange has sufficient thickness and rigidity, there is little deformation of the flange and the adjacent taper overall and a seal can be securely made at an adequately narrow width.

It is desirable that the flange of the rivet main body be held and, when the shaft of the mandrel is pulled out, the material of the sleeve of the rivet main body is pushed outward by the head of the mandrel, expanding in diameter and a section with expanded diameter is formed. The base body is sandwiched between the section with expanded diameter of the rivet main body and the taper, and the rivet is fastened to the base body.

It is desirable that a linear seal be formed between the taper and the edge of the top opening of the base body.

The taper of the rivet main body and the edge of the opening of the base body securely make a metal seal at a narrow width.

It is desirable for the mandrel, when fastened to the base body, to fracture at a small-diameter fracturing place of the shaft and the part from the fracturing part to the head to remain on the fastening part.

An additional embodiment of the invention is a sealing construction that seals the opening of the base body; the construction is such that the top boundary of the opening forms an edge and, when the blind rivet is fastened to the opening, the taper and top edge of the opening are in contact and the opening is sealed.

According to the invention, sufficient sealing characteristics are achieved with a single blind rivet, and a blind rivet with a high degree of watertightness is obtained.

Also, a sealing construction that uses this blind rivet is obtained.

DETAILED DESCRIPTION OF THE PREFERRED EMBODIMENT

Below, the blind rivet according to the embodiments of the invention will be described.

Figure 1:
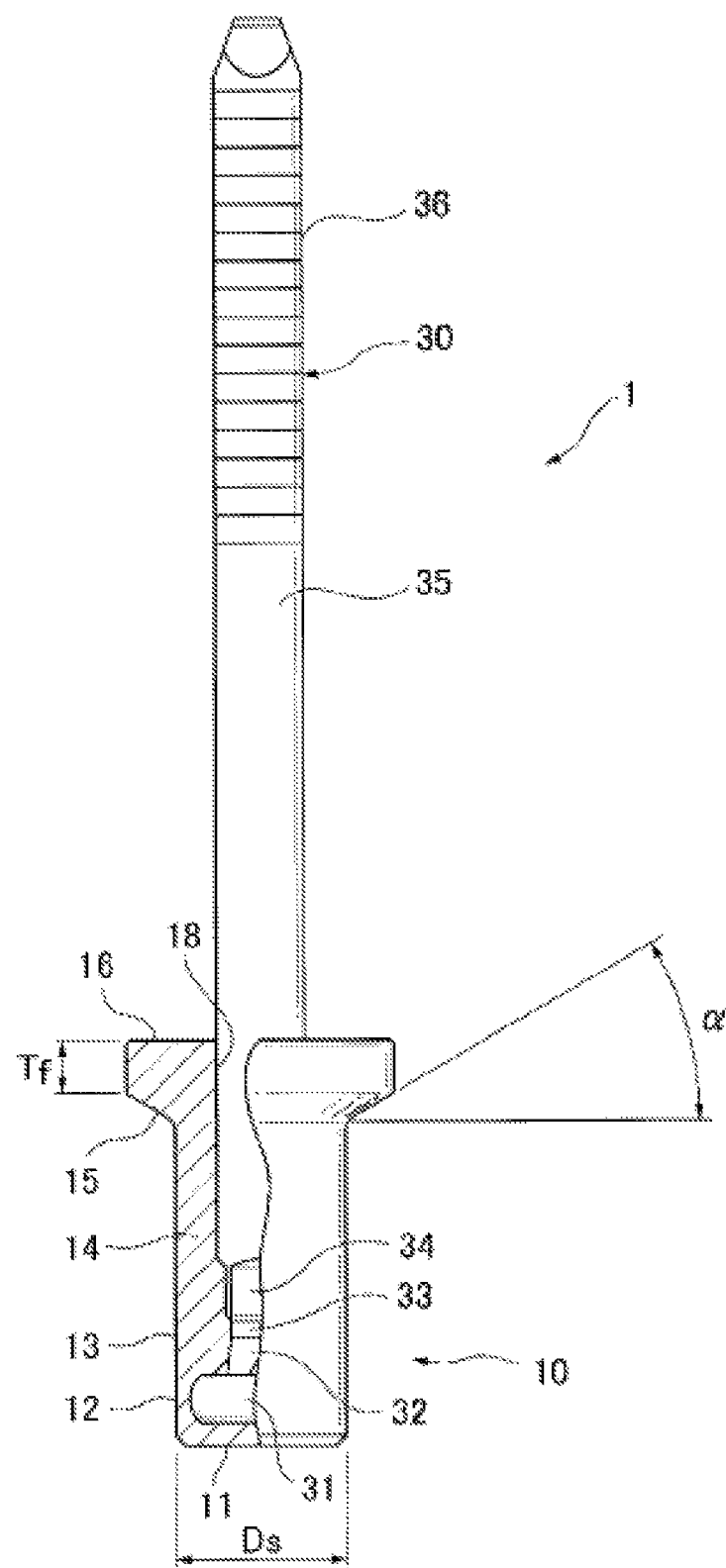
FIG. 1 is an upright view with a partial cross-section of the blind rivet of the first embodiment of the invention.

FIG. 1 is an upright view with a partial cross-section of the blind rivet of the first embodiment of the invention. In the description of the invention, the top of FIG. 1 is the up direction, and the bottom is the down direction. The blind rivet 1 is provided with a rivet main body 10 and a mandrel 30. A head 31 of the mandrel 30 and a part of a shaft are inserted into the bottomed hole 18 of the rivet main body 10 and fixed.

(Mandrel)

The mandrel 30 has a head 31 at one end. The head 31 has the shape of a large-diameter disk. The mandrel 30 has a slender shaft that adjoins the head 31. The shaft has a shaft base 32, a fracturing part 33, a small-diameter part 34, a shaft part 35 and a gripping part 36. The part adjacent to the head 31 of the shaft is the discoid shaft base 32 that has a smaller diameter than that of the head 31. Adjacent to the shaft base 32 there is a fracturing part 33 that has a smaller diameter than that of the shaft base 32. In assembling the blind rivet 1, the fracturing part 33 is the part that is to be seated in the bottomed hole 18 of the rivet main body 10. When the shaft of the mandrel 30 is pulled out with a fastening mechanism, a certain extraction force is added and the mandrel 30 breaks at the fracturing part 33.

Adjacent to the fracturing part 33, there is a small-diameter part 34 with an outer diameter smaller than that of the fracturing part 33. The diameter of the small-diameter part 34 is nearly equal to the diameter of the shaft base 32. Adjacent to the small-diameter part 34, there is a shaft part 35 of a slender cylindrical shape with a diameter larger than that of the small-diameter part 34 but smaller than that of the head 31. Adjacent to the shaft part 35, there is a gripping part 36 with nearly an equal diameter to that of the shaft part 35. On the gripping part 36, several engagement grooves are formed at regular intervals around the circumference so as not to cause slipping when gripped by the gripping member of the engagement mechanism.

The material of the mandrel 30 is steel, aluminum, stainless steel, etc. and the material is harder than that of the rivet main body 10.

(Rivet Main Body)

The complete rivet main body 10 is of cylindrical shape and has a flange 16, a taper 15 and a sleeve at one end. The other end of the sleeve is closed. The sleeve has a bottom 11, a thin section 12, a thick section 13 and a cylindrical part 14. The end of sleeve, the other end, is the bottom 11; under the bottom 11 is a flat, round surface. Adjacent to the bottom 11, there is thin section that surrounds the head 31 of the mandrel 30. Adjacent to the thin section 12, there is a thick section 13 that surrounds the shaft base 32, the fracturing part 33 and the small-diameter part 34 of the mandrel 30. Adjacent to the thick section 13, there is a cylindrical part 14 that surrounds the shaft part 35 of the mandrel 30. The outer diameter of the sleeve (thin section 12, thick section 13 and cylindrical part 14) is roughly equal to the inner diameter of the opening 53 of the base body 51 or a little smaller, of a size that can be inserted into the opening 53.

The opening 53 of the base body 51 generally has a round cross-section and is a hole that has to be sealed.

The top boundary of the opening 53 is formed in the shape of an edge, and a taper is not formed.

Adjacent to the cylindrical part 14, there is a taper 15 of a circular truncated cone shape. When the bottom 11 of the blind rivet 1 is inserted into the opening 53 of the base body 51 first, the part near the boundary of the cylindrical part 14 of the taper 15 contacting the edge of the opening is stopped. The angle between the cylindrical part 14 and the taper 15 suddenly changes without continuing as a curve. The diameter of the taper 15 tends to become larger from the cylindrical part 14 to the flange 16.

The taper 15, being the angle α made by the central axis of the rivet main body 10 and the orthogonal surface, is 3-80°. That is, in the cross section containing the central axis of the rivet main body 10, the straight line of the taper surface of the taper 15 and the straight line orthogonal to the central axis of the rivet main body 10 cross at an angle of 3-80° (the angle (90°-α) of the straight line of the taper surface and the central axis of the rivet main body is 20 [sic]-87°). Preferably, this angle α is 15-35°.

Adjacent to the taper 15, there is a large-diameter flange 16. The top of the flange 16 is flat. The flange 16 is of a thick discoid shape, and its outer diameter is uniform from the top to the boundary of the taper 15. The flange 16 has sufficient hardness. The thickness Tf of the flange 16 is 15-75% of the diameter Ds of the sleeve. Here, the dimensions Tf and Ds are the measurements when the rivet main body 10 and the mandrel 30 are assembled.

The material of the rivet main body 10 is steel, aluminum, stainless steel, copper, etc. and is formed with a softer material than that of the mandrel 30.

On the inside of the rivet main body 10, a bottomed hole 18 is formed that extends axially downward from the top of the flange 16. The shaft base 32, fracturing part 33 and part of the small-diameter part 34 are set into the bottomed hole 18 adjacent to the head 31 of the mandrel 30 above the bottom 11. The head 31 of the mandrel 30, the upper edge of which is pressed by the thick section (13) of the rivet main body 10, will not come out.

The inner diameter of the bottomed hole 18 of the rivet main body 10 before the mandrel 30 is inserted is to some extent of a large uniform diameter equal to the outer diameter of the head 31 of the mandrel 30, and the head 31 can be inserted into the bottomed hole head first. The diameter of the sleeve (thin section 12, thick section 13, cylindrical part 14) of the rivet main body 10 before inserting the mandrel 30 is uniform.

(Blind Rivet)

In the blind rivet assembled with a rivet main body 10 shown in FIG. 1 and a mandrel 30, the mandrel 30 is inserted into the bottomed hole of the rivet main body 10 with the head 31 going first. The head 31 of the mandrel 30 is inserted up to a position abutting the inner surface of the bottom 11. In this situation, the inner circumference of the bottomed hole 18 and the head 31 are in close contact or have a tiny space between them. There is a space between the inner circumference of the bottomed hole 18, the shaft base 32 of the mandrel 30, the fracturing part 33 and the small diameter part 34.

After the mandrel 30 is inserted into the bottomed hole 18, the sleeve part narrows to a uniform diameter from the bottom 11 up to the taper 15 by a rolling, fastening process or the like, and the material of the sleeve moves into the space between the inner circumference of the bottomed hole 18, the shaft base 32 of the mandrel 30, the fracturing part 33 and the small diameter part 34. As shown in FIG. 1, there is no space between the inner circumference of the bottomed hole 18, the shaft base 32 of the mandrel 30, the fracturing part 33 and the small diameter part 34. The shapes of the thick section 13 of the rivet main body 10 and cylindrical part 14 are then formed.

Thus, the thick section 13 is in contact with the top of the head 31 and the head 31 can be extracted from the bottomed hole 18.

Figure 2:
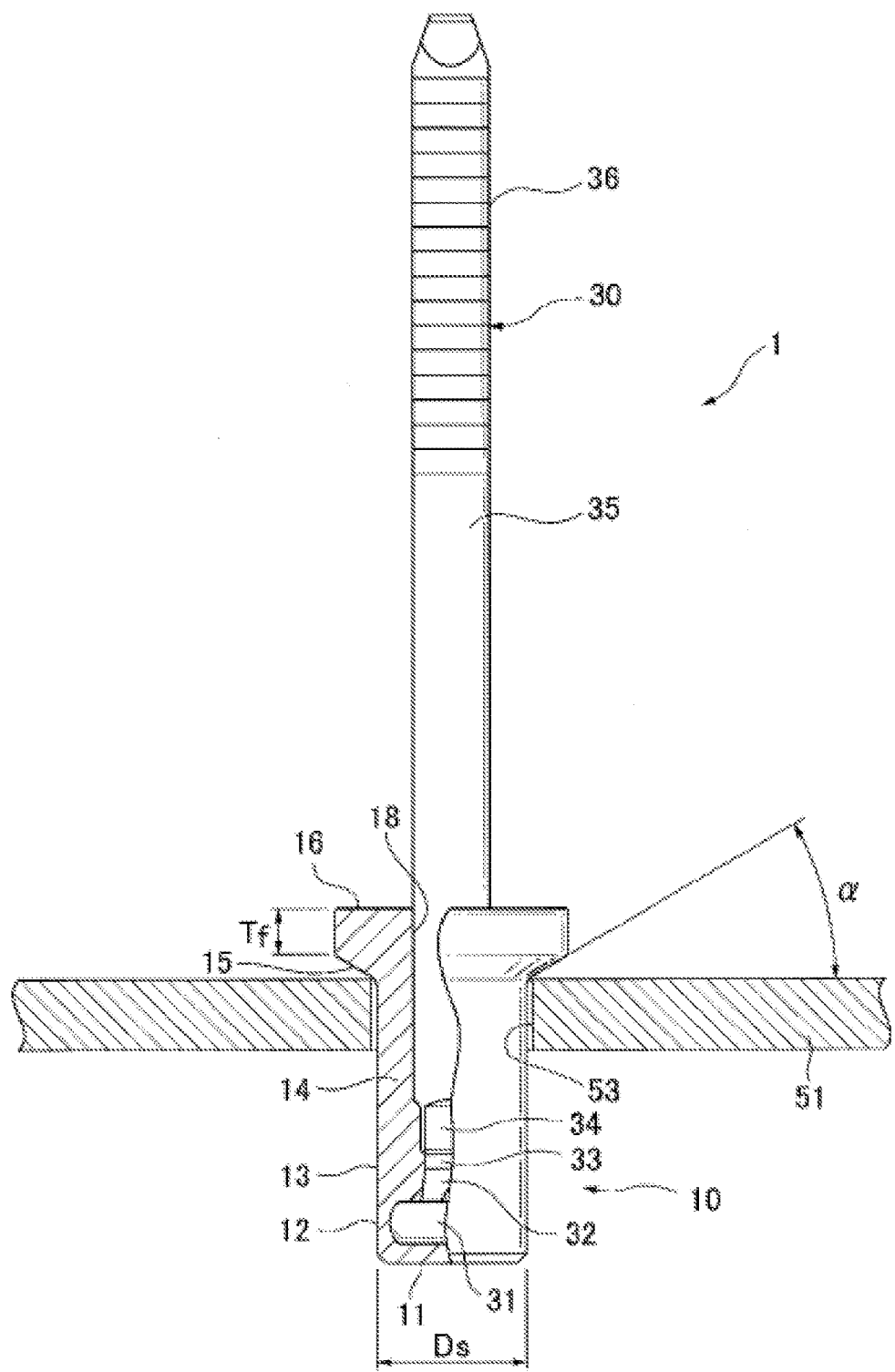
FIG. 2 is an upright view with a partial cross-section showing the insertion of the blind rivet of FIG. 1 into the opening of the base body.

FIG. 2 is an upright view of a partial cross-section showing the situation where the blind rivet of FIG. 1 is inserted into the opening 53 of the base body 51. The lower side of FIG. 2 is the blind side, and the operation of installing the blind rivet 1 is carried out from above.

The base body 51 is one piece, but the base body 51 could be several pieces; in that case, the positions of the openings 53 of each base body 51 are superimposed to fit.

When the blind rivet 1 of FIG. 1, assembled with a rivet main body 10 and a mandrel 30, is inserted into the opening 53 of the base body 51 from the top in FIG. 2, the taper 15 of the rivet main body 10 abuts the surface around the opening 53 of the base body in the situation of FIG. 2.

(Fastening)

Figure 3:
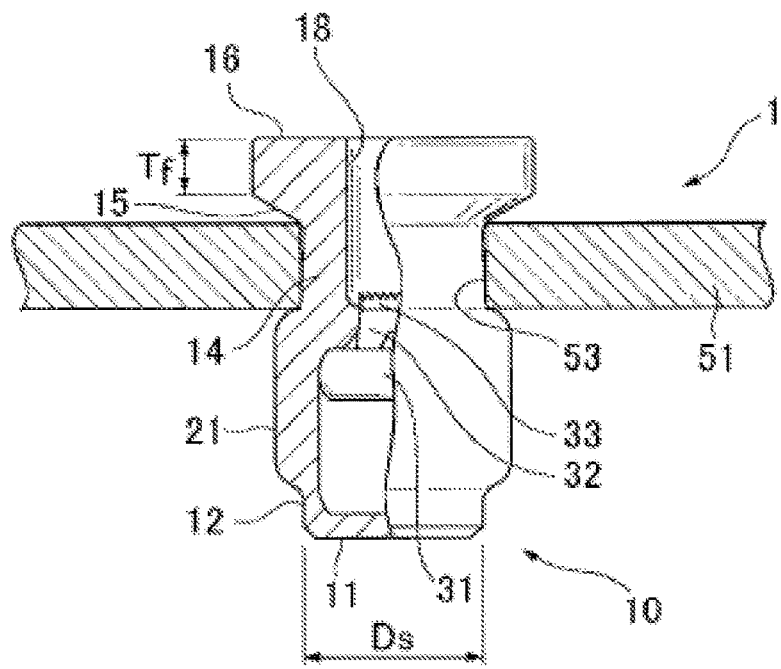
FIG. 3 is an upright view with a partial cross-section of the blind rivet of FIG. 1 fastened to the base body.

In reference to FIGS. 2 and 3, fastening of the blind rivet 1 of the embodiment of the invention onto the base body 51 will be described.

From the situation of FIG. 2, the top of the flange 16 of the rivet main body 10 is supported, and, when the gripping part 36 of the mandrel 30 is gripped by the gripping member of the fastening mechanism, it is drawn upward. The head 31 of the mandrel 30, while expanding the thick section 13 of the rivet main body 10 from inside, moves up. The diameter of the thick section 13 and the cylindrical part 14 become larger with the expansion by the head 31 and the length of the thick section 13 and the cylindrical part 14 becomes smaller. By the change of the thick section 13 and the cylindrical part 14, a section with enlarged diameter 21 is formed. The outer diameter of the section with enlarged diameter 21 becomes larger than the inner diameter of the opening 53, and the inner diameter is nearly equal to the outer diameter of the head 31.

The part of the cylindrical part 14 inside the opening 53 of the base body 51 is checked by the opening and will not bulge. When the head 31 of the mandrel 30 approaches the base body 51, the head 31, not being able to expand the cylindrical part 14, cannot rise above it.

Moreover, when the gripping part 36 of the mandrel 30 draws upward, the mandrel 30 is broken at the fracturing part 33. The head 31 and the shaft base 32 remain inside the rivet main body 10, and the shaft 35 and the gripping part 36 are extracted from the bottomed hole 18 of the rivet main body 18. Thus, the base body 51 is sandwiched between the section with enlarged diameter 21 of the rivet main body 10 and the taper 15 and the blind rivet 1 is fastened.

Both the lower end of the taper 15 and the inner edge of the top of the opening 53 of the base body 51 are sealed by the stress at the narrow line. The upper boundary of the opening 53 of the base body 51 is formed in an edge, and a taper is not formed. Because of this, both the upper edge of the opening 53 and taper 15 of the rivet main body 10 will not be touching by a large width.

Also, both the upper edge of the enlarged diameter portion 21 and the inner edge of the opening 52 below the base body 51 are sealed by high stress at the line with narrow width.

Both the metal of the rivet main body 10 and the metal of the base body 51 are sealed in close contact.

According to the embodiment of the invention, the taper 15 of the rivet main body 10 has a small area contacting the inner edge of the opening 53 of the base body 51 and is in contact by means of a strong stress. Because of this, the inner edge of the taper 15 or the opening 53 or both being in close contact through deformation are able to attain a seal and a high degree of watertightness.

Also, with the blind rivet according to the embodiment of the invention and the opening 53 of the base body 51, a sealing structure that seals the opening 53 of the base body 51 is formed. In this sealing structure, the upper border of the opening 53 is formed into an edge, and, in the situation where the blind rivet is fastened into the opening 53, both the taper 15 and the upper edge of the opening 53 are in close contact and opening 53 is sealed.

COMPARISON EXAMPLE 1

Figure 4:
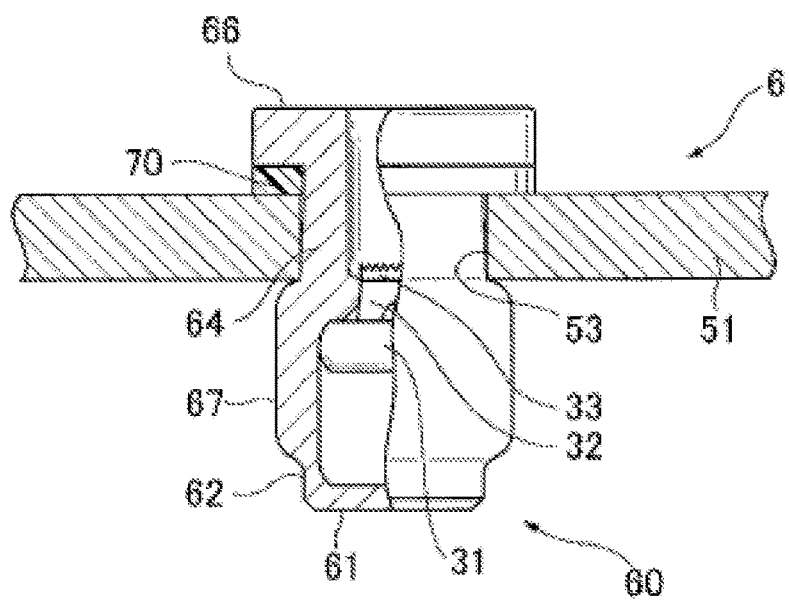
FIG. 4 is an upright view with a partial cross-section of a blind rivet of prior art with attached washer that is fastened to the base body.

FIG. 4 is a plan view of a partial cross-section after using a resinous washer 70 and the bottom of a flange of prior art fastening the level rivet main body 60 to the base body 51. The mandrel 30 is the same as the mandrel 30 of the embodiment of the invention and is shown with the same reference number. The base body 51 is the same as the base body 51 used in the embodiment of the invention and is shown with the same reference number. The rivet main body 60 of Comparison Example 1 has a bottom 61, a thin section 62, a section with enlarged diameter 67, a cylindrical part 64 inside the opening 53 and a flange 66.

The base body 51 is sandwiched between the section with enlarged diameter 67 of the rivet main body 60 and the washer 70, and the blind rivet 6 is tightened to the base body 51.

After fastening the blind rivet 6 of Comparison Example 1, between the back of the flange 66 and the top of the washer 70 and between the bottom of the washer 70 and the base body 51, the contact surface is wide and the contact pressure between members is low so a sufficient seal cannot be attained. Also, a resinous washer 70 is necessary besides the blind rivet 6, and the cost is increased.

COMPARISON EXAMPLE 2

Figure 5:
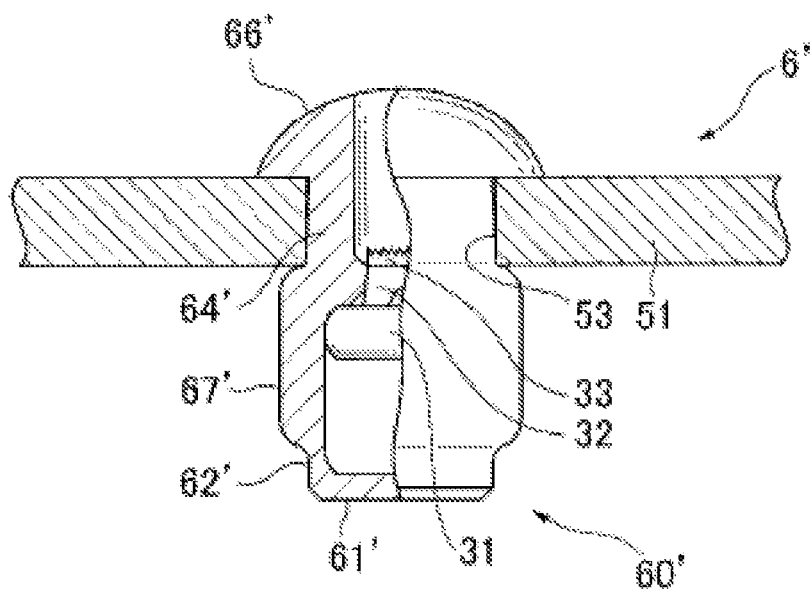
FIG. 5 is an upright view with a partial cross-section of a blind rivet of prior art without a taper that is fastened to the base body.

FIG. 5 is a plan view of a partial cross-section when the bottom of the flange of prior art fastens the rivet main body 60' of a top spherical surface evenly to the base body 51. The mandrel 30 is the same as the mandrel 30 of the embodiment of the invention and is shown with the same reference number. The base body 51 is the same as the base body 51 used in the embodiment of the invention and is shown with the same reference number. The rivet main body 60' has a bottom 61', a thin section 62', a section with enlarged diameter 67', a cylindrical part 64' inside the opening 53 and a flange 66'.

The base body 51 is sandwiched between the enlarged diameter portion 67' of the rivet main body 60' and the flange 67' and the blind rivet 6' is fastened.

After fastening the blind rivet 6' of Comparison Example 2, between the back of the flange 66' and the base body 51, the contact surface is wide and the contact pressure between members is low so that a sufficient seal cannot be attained.

Compared to comparison Examples 1 and 2, the blind rivet according to the embodiment of the invention has a taper under the flange, so by means of high stress in a small area, it contacts the edge of the opening of the base body. Because of this, sufficient sealing is attained with the single blind rivet, and a blind rivet with a high degree of watertightness can be achieved.

KEYS TO TEXT IN DRAWINGS

1 blind rivet
6 blind rivet
10 rivet main body
11 bottom
12 thin section
13 thick section
14 cylindrical part
15 taper
16 flange
18 bottomed hole
21 section with expanded diameter
30 mandrel
31 head
32 shaft base
33 fracturing part
34 small-diameter part
35 shaft
36 gripping part
51 base body
53 opening
60 rivet main body
61 bottom
66 section with expanded diameter
70 washer

The invention claimed is:

1. A blind rivet for fastening to a base body having an opening, the blind rivet comprising:
   a rivet body having a tapered end and a blind end, the tapered end including a flange and a taper with an axially diminishing outer diameter toward the blind end and a sleeve extending in an axial direction from the taper toward the blind end, the sleeve defining a hole and the hole including a bottom disposed toward the blind end;
   a mandrel having a head and a shaft extending from the head, the shaft having a smaller diameter than the head, and
   wherein the head is arranged in the hole toward the bottom; the shaft extending from the flange end; an inner surface of the sleeve including a reduced diameter stop portion having a diameter smaller than a head diameter and larger than a shaft diameter, the reduced diameter portion positioned adjacent to the head and between the head and the flange, the reduced diameter portion and the bottom preventing removal of the head from the rivet body,
   wherein an angle of the taper with respect to a plane perpendicular to the longitudinal axis of the rivet body is 15-35°; and
   wherein the thickness of the flange is 15-75% of the outer diameter of the sleeve.

2. The blind rivet of claim 1,
   wherein when the flange is held and the shaft of the mandrel is pulled out, material of the sleeve is pushed outward by the head and expands in diameter and a sleeve section of expanded diameter is formed; the base body being sandwiched between the sleeve section and the taper, and the rivet being therefore fastened to the base body.

3. The blind rivet of claim 2, wherein in use a seal is formed at a contact interface between the taper and the opening.

4. The blind rivet of claim 2, further including a reduced diameter portion, and wherein during setting the mandrel fractures at the reduced diameter portion and a portion of the mandrel including the head remains in the rivet body.

5. The blind rivet of claim 1, wherein the bottom completely closes the blind end of the sleeve.

6. The blind rivet of claim 1, wherein the head is trapped between the bottom and the reduced diameter stop portion of the sleeve.

7. A sealing construction that uses the blind rivet of claim 1, and that seals the opening in which a top boundary of the opening forms an edge and, when the blind rivet is fastened to the opening, the taper and top edge of the opening are in contact and the opening is sealed.

8. In combination, a blind rivet and a base body, the base body including an opening in a surface of the base body, the combination comprising:
- a rivet body having an end with a taper and a blind end, the taper having an axially diminishing outer diameter toward the blind end and a sleeve extending in an axial direction from the taper toward the blind end, the sleeve defining a hole and the hole including a bottom disposed toward the blind end;
- a mandrel having a head and a shaft extending from the head, the shaft having a smaller diameter than the head; and
- wherein the head is arranged in the hole toward the bottom; the shaft extending from the flange end; an inner surface of the sleeve including a reduced diameter stop portion having a diameter smaller than a head diameter and larger than a shaft diameter, the reduced diameter portion positioned adjacent to the head and between the head and the flange, the reduced diameter portion and the bottom preventing removal of the head from the rivet body; and
- wherein the taper engages the opening to form a seal between the taper and opening and the taper extends past the surface of the base body; and
- wherein an angle of the taper with respect to a plane perpendicular to the longitudinal axis of the rivet body is 15-35°; and
- wherein the thickness of the flange is 15-75% of the outer diameter of the sleeve.

9. A blind rivet in combination with a base body, the blind rivet for fastening to the base body via an opening in the base body, the combination comprising:
- a base body including an opening;
- a rivet body having a tapered end and a blind end, the taper including an axially diminishing outer diameter toward the blind end and a sleeve extending in an axial direction from the taper toward the blind end, the sleeve defining a hole and the hole including a bottom disposed toward the blind end;
- a mandrel having a head and a shaft extending from the head, the shaft having a smaller diameter than the head; and
- wherein the head is arranged in the hole toward the bottom; the shaft extending from the flange end; an inner surface of the sleeve including a reduced diameter stop portion having a diameter smaller than a head diameter and larger than a shaft diameter, the reduced diameter portion positioned adjacent to the head and between the head and the flange, the reduced diameter portion and the bottom preventing removal of the head from the rivet body; and
- wherein the lower end of the taper and an inner edge of the opening engage to seal at a narrow line; and
- wherein an angle of the taper with respect to a plane perpendicular to the longitudinal axis of the rivet body is 15-35°; and
- wherein the thickness of the flange is 15-75% of the outer diameter of the sleeve.

\* \* \* \* \*